United States Patent [19]

Hollands

[11] 3,852,731
[45] Dec. 3, 1974

[54] AC VOLTAGE SENSING APPARATUS

[75] Inventor: Daniel H. Hollands, Webster, N.Y.

[73] Assignee: Rochester Instrument Systems, Inc., Rochester, N.Y.

[22] Filed: Oct. 12, 1973

[21] Appl. No.: 405,854

[52] U.S. Cl............. 340/248 B, 307/234, 307/261, 328/111, 340/248 P
[51] Int. Cl. ......................................... G08b 21/00
[58] Field of Search .......... 340/248, 253, 213, 172, 340/167 A; 317/33 R; 307/234; 328/120, 111; 323/21

[56] References Cited
UNITED STATES PATENTS
3,584,259  6/1971  Traub et al. ................. 317/33 R X Primary Examiner—John W. Caldwell
Assistant Examiner—Daniel Myer

[57] ABSTRACT

Voltage sensing apparatus for detecting a change in an AC voltage across a line and actuating an alarm when the change occurs. In a preferred embodiment of the invention, the alternating current voltage across the line is converted into a train of square wave pulses, each of which has a pulse width which is a function of the amplitude of the alternating current voltage. A pulse width detector means receives the train of pulses and triggers an alarm means when the pulse width of any one of the pulses in the train varies with respect to a predetermined pulse width. The apparatus is particularly useful in a three-phase system to determine if the voltage across any one of three lines in the three-phase system drops below a reference voltage level.

2 Claims, 2 Drawing Figures

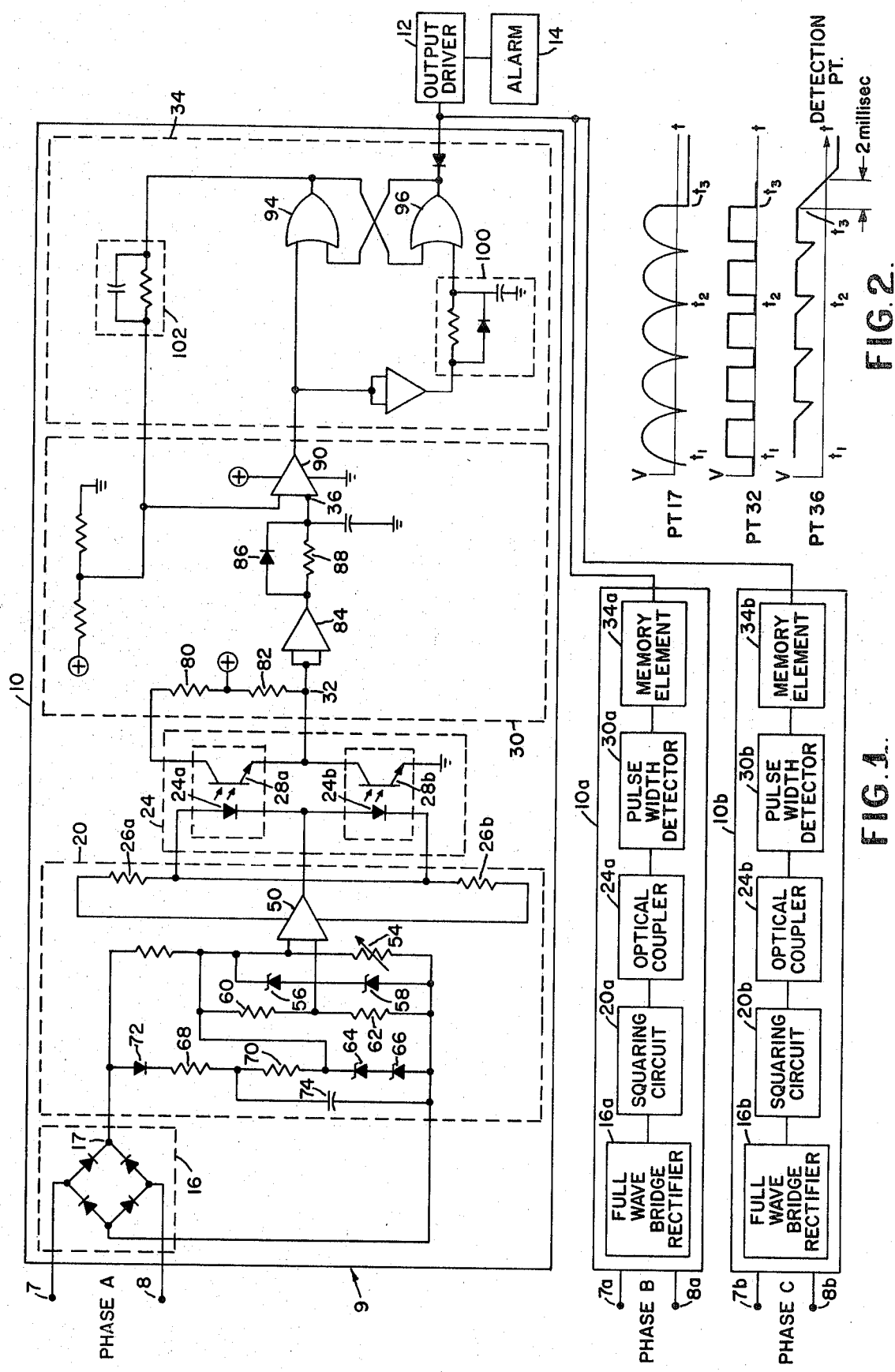

3,852,731

AC VOLTAGE SENSING APPARATUS

BACKGROUND OF THE INVENTION

This invention relates to apparatus for detecting a change in a voltage of an alternating current voltage supply and more particularly to apparatus for detecting an AC voltage drop or dip across a line in a single phase or multiphase AC electrical system.

DESCRIPTION OF THE PRIOR ART

Although the present invention is suited for more general application, it is particularly adapted for use in detecting a voltage drop or dip across a line connected to a source of an alternating current voltage such as in a single phase or in a three-phase AC electrical system and actuating an alarm when the voltage drop or dip occurs.

The main difficulty with known devices or apparatus for detecting a voltage drop or dip across a line is that the response time for detection is relatively slow. In the past, AC voltage detecting devices or apparatus utilized some method of storing peak voltages of the wave form. Thus, on a change of input voltage from a high voltage to a low voltage, the response time of prior art devices is dependent on the amplitude of the input voltage, prior to the voltage interruption.

Accordingly, there is a pressing need for an AC voltage sensing apparatus that obviates the foregoing prior art problems and has a relatively fast response time in both single phase and multiphase AC electrical systems. Further, there is a need for an AC voltage sensing system that detects a voltage interruption or dip and actuates an alarm within a fractional part of a cycle and is fast responding.

SUMMARY OF THE INVENTION

It is therefore an object of the present invention to provide an improved voltage sensing apparatus which obviates the foregoing prior art problems and is fast acting in the detection of voltage drop or dip across a line in a single phase or multi-phase AC electrical system.

Another object of the invention is to provide a single-phase detecting apparatus which is isolated from the AC electrical supply.

Briefly described, in a preferred embodiment of the invention for a three-phase AC electrical system, the sensing apparatus includes an actuable alarm and three identical line monitoring circuits each having a squaring circuit, an optical isolation coupling means and a pulse width detector means responsive to the output of the isolation coupling means which circuits are adapted to actuate the alarm when the voltage in any one of the three-phase lines falls below a predetermined level.

A primary application of the apparatus is in power utility substations and switchyards. This apparatus may be used to monitor the various AC voltage lines and to provide signals for monitoring and recording devices during power system disturbances.

BRIEF DESCRIPTION OF THE DRAWING

In the above-mentioned and other features and objects of the present invention and the manner of attaining them will become more apparent by reference to the following detailed description of the preferred embodiment of such invention taken in conjunction with the accompanying drawing in which FIG. 1 shows a voltage sensing apparatus for a three-phase AC electrical system having three identical line monitoring circuits, two of which are shown in block form and one in detail schematic form;

FIG. 2 is a chart showing voltage wave forms within the voltage sensing apparatus of FIG. 1.

DESCRIPTION OF THE PREFERRED EMBODIMENT

Since many of the circuit elements used in conjunction with the present invention are well known in the art, their description will only be briefly described in connection with the following detailed description.

Turning now to the drawing, there is shown a voltage sensing apparatus 9 which includes three identical line monitoring circuits 10, 10a, 10b, each coupled to a single output driver circuit 12 which in turn is adapted to actuate an alarm 14 such as a light emitting diode, solid state transistor output or relay contact output. Two of the line monitoring circuits 10a, 10b are shown in block form for phase B and C respectively of a three-phase AC electrical system and one in detailed schematic form at form 10 for phase A. Line monitoring circuit 10a has input terminals 7a and 8a while line monitoring circuit 10b has input terminals 7b and 8b. Although the voltage sensing apparatus 9 shown in FIG. 1 is for the three-phase AC electrical system having the three phases A, B and C, the apparatus 9 may also be used for a single phase AC electrical system without departing from the invention by the use of the line monitoring circuit 10, output driver 12 and alarm 14.

Viewing the block form 10, a full wave rectifier bridge 16 in response to a line voltage across terminal 7 and 8 produces a rectified output shown at point 17 in FIG. 1 and in FIG. 2 as PT17. The rectified output at point 17 is applied to a squaring circuit shown at 20. The output of the squaring circuit 20 is a train of square wave pulses. This train of square wave pulses is applied to two light emitting diodes (LED) 24a and 24b in an optical coupler 24. The width of each pulse in the pulse train is a function of the amplitude of the AC rectified output at point 17. In other words, the pulse width of each pulse in the train is inversely related to the amplitude of the line voltage at terminals 7, 8 and is related to its derived rectified output from the rectified bridge 16. Since this invention is concerned with a fast detection of changes in the amplitude of the line voltage, and more particularly in a voltage drop, dip or disturbance, apparatus in accordance with this invention utilizes the pulse width of a square wave pulse from the squaring circuit 20 to determine any change in the level of the AC voltage across terminals 7, 8. If the voltage level of the line voltage drops, the corresponding derived square wave pulse for that particular cycle will have a greater width than a predetermined pulse width of a square wave pulse under the desired optimum operating conditions.

Each light emitting diode 24a and 24b is coupled to a source of potential through resistors 26a and 26b (see schematic form FIG. 1) and is adapted to illuminate two separate phototransistors 28a and 28b to change conductivity in accordance with the variations in the intensity of the input light and in accordance with the input square wave to such light emitting diodes 24a, 24b. By the use of these light emitting diodes 24a, 24b and photo-transistors 28a, 28b (known as optical couplers), there is provided complete electrical isolation in the remaining portions of the line monitoring circuit 10 for actuating the alarm 14. Although other devices such as transformers or capacitors could be used to provide isolation, optical coupler 24 is preferred because of its fast response time, small size and high voltage characteristics. Each of the photo-transistors 28a and 28b provide a square wave input signal to a pulse-width detector 30. The square wave input signal is shown at point 32 and in FIG. 2 as PT32. The detector 30 is adapted to produce a triggering signal to a memory element 34 when the line voltage across terminals 7, 8 falls below a predetermined reference level and the pulse width of a square wave pulse derived therefrom is greater than a predetermined width (see the detection point PT36 indicated in the wave form shown at point 36 in phase line circuit 10). The memory element 34 in turn actuates the driver circuit 12 which causes the actuation of the alarm 14.

Turning now to line circuit 10, the squaring circuit 20 may take many forms known in the art, some of which are commercially available and include a standard operational amplifier 50. The non-inverting input to the operational amplifier 50 is coupled to an output port of the bridge 16 through a resistor 52 and through a second adjustable resistor 54 to another port of bridge 16. Two Zener diodes 56 and 58 act to clamp the maximum possible positive voltage applied to the non-inverting input of the operational amplifier 50. The non-inverting input is connected between two voltage divider resistors 60 and 62 which in turn is electrically coupled between a shunt limiter which includes two Zener diodes 64 and 66, resistors 68 and 70 and a diode 72.

The photo-transistors 28a and 28b are respectively coupled to positive potential through resistors 80 and 82. An inverting amplifier 84 provides a signal to a shunt limiter having a diode 86 and resistor 88. This latter circuit applies an input to the inverting input of an operational amplifier 90 which produces a negative output signal when the wave form shown at point 36 drops or dips below a predetermined level indicating the negative portion of the square wave (position 32) has remained negative for too long a duration and that the AC input signal is below the input threshold. The negative pulse triggers the memory element 34 having two nand gates 94 and 96 which produces an output to the driver circuit 12. The memory element 34 will be reset by circuitry 100 if no error signal again appears after a predetermined interval of a few milliseconds. A positive feedback circuit 102 is also included to provide a dead band effect in a well known manner.

It may now be seen that the line monitoring circuit 10, the output driver 12 and alarm 14 are used for monitoring of the lines in a three-phase AC electrical system, namely, phase A and that identical line monitoring circuits 10a, 10b may be used for monitoring phases B and C respectively. If desired, a single phase AC electrical system may be monitored for a voltage drop or dip by the voltage sensing apparatus comprising the line monitoring circuit 10, the output driver 12 and alarm 14.

It will be understood by those skilled in the art that the embodiment of the invention shown and described herein is subject to various other modifications without departing from the scope and spirit of the invention. Accordingly, it should be understood that the invention is not limited by the exemplary embodiment shown and described but rather only by the claims as construed in the light of the spirit of the invention.

What is claimed is:

1. Apparatus for determining if an alternating voltage from an electrical source applied across a line is less than a reference voltage level, said apparatus comprising:
   a. an actuable alarm, and
   b. alarm actuating means coupled to said alternating voltage source and said alarm including:
      i. means for producing a square wave pulse the width of which varies inversely as the function of the amplitude of said alternating voltage, and
      ii. pulse width detector means responsive to the pulse width of said square wave being greater than a predetermined width for actuating said alarm.

2. The invention as set forth in claim 1 further including optical coupler means disposed between said square wave producing means and said pulse width detector means for providing complete electrical isolation therebetween.

* * * * *